United States Patent [19]

Lee et al.

[11] Patent Number: 4,584,504
[45] Date of Patent: Apr. 22, 1986

[54] INTEGRATED CIRCUIT FOR DRIVING A D.C. MOTOR HAVING OPERATIONAL MODES

[75] Inventors: Bang W. Lee, SuWon; Sung I. Hong, YangPyonKun, both of Rep. of Korea

[73] Assignee: Samsung Semiconductor and Telecommunications Co., Ltd., KyoungSangBukDo, Rep. of Korea

[21] Appl. No.: 649,280

[22] Filed: Sep. 11, 1984

[30] Foreign Application Priority Data

May 10, 1984 [KR] Rep. of Korea ................ 84-2520[U]

[51] Int. Cl.⁴ .............................................. H04Q 7/02
[52] U.S. Cl. ..................................... 318/16; 318/293; 340/825.69
[58] Field of Search ................................. 318/16, 293; 340/825.69, 825.72, 870.28; 307/270, 262, 255, 254

[56] References Cited

U.S. PATENT DOCUMENTS

| 4,275,394 | 6/1981 | Mabuchi et al. | 340/825.69 X |
| 4,349,986 | 9/1982 | Tsukuda | 340/825.69 X |
| 4,488,094 | 12/1984 | Min et al. | 318/16 |
| 4,490,655 | 12/1984 | Feldman | 307/254 X |

OTHER PUBLICATIONS

Giles et al, "Two-Chip Radio Link Pilots Toys and Models", Electronics, Jun. 5, 1980, vol. 53, No. 13, pp. 145–149.

*Primary Examiner*—William M. Shoop, Jr.
*Assistant Examiner*—Bentsu Ro
*Attorney, Agent, or Firm*—Bacon & Thomas

[57] ABSTRACT

The present invention relates to an integrated circuit for driving a d.c. motor with radio control comprising a receiving circuit for receiving and detecting certain signals transmitted from a transmitter, an amplifier for amplifying an output signal of said receiving circuit, a peak detector for converting the said amplified audio signal into a d.c. voltage, a comparator which have a hysteresis character dependent on the output level of the peak detector, a voltage regulating circuit supplying a stabilized voltage into all other components, and a direction control circuit to generate logic control signals deciding actual operation mode of the d.c. motor and motor driving circuits to produce motor driving signals by the output signal of the direction control circuit.

6 Claims, 21 Drawing Figures

Fig. 1

PRIOR ART

Fig. 2

PRIOR ART

Fig. 3

PRIOR ART

Fig. 4

PRIOR ART

INTEGRATED CIRCUIT FOR DRIVING A D.C. MOTOR HAVING OPERATIONAL MODES

BACKGROUND OF THE INVENTION

The present invention relates to an integrated circuit for driving a d.c. motor with radio controller. The invention is particularly directed to an integrated circuit for operating a switching machanism of a d.c. motor having a forward-to-reverse bidirectional mode or a forward-to-reverse mode added to a latch function with the input signal controlled by radio.

Figure 1:
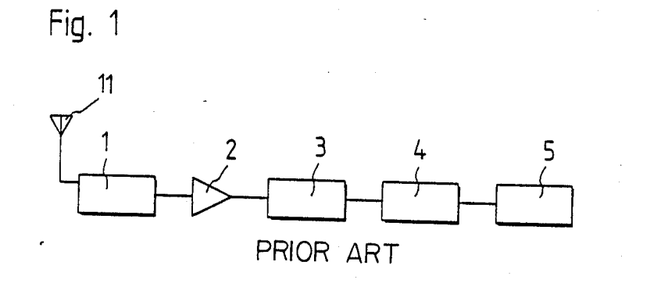
FIG. 1 is a block diagram of a prior art d.c. motor driving circuit.
Figure 3:
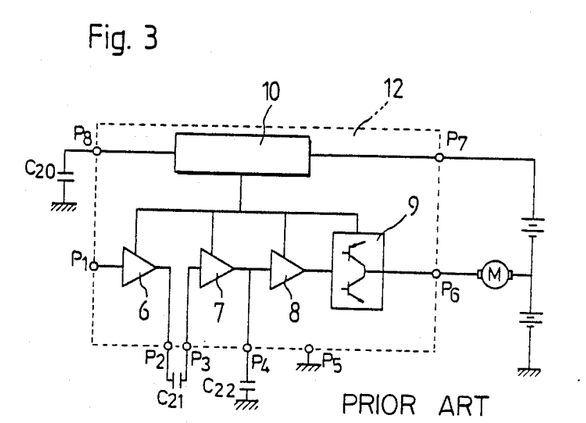
FIG. 3 is a block diagram of a prior art integrated circuit for driving a d.c. motor having a forward-to-reverse control.
Figure 4:
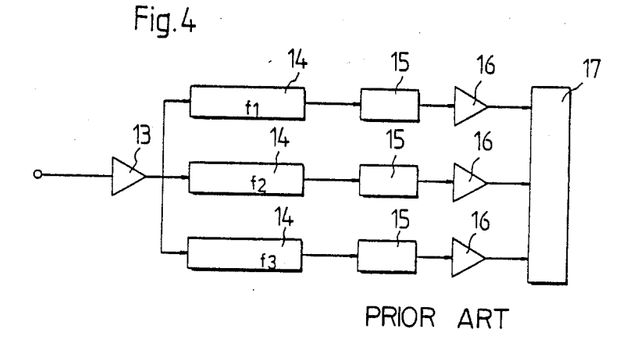
FIG. 4 is a block diagram of prior art motor driving circuit having three functions of forward-to-reverse and stop modes.

In prior arts, there were various kinds of remote control methods for model cars such as shown in FIG. 1, FIG. 3 and FIG. 4.

Figure 2:
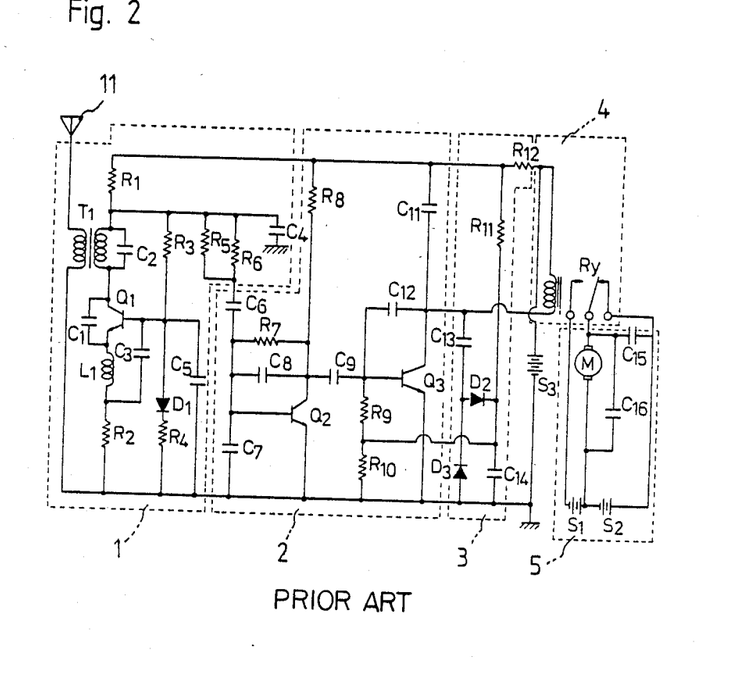
FIG. 2 is the concrete circuit diagram of FIG. 1.

FIG. 1 is a block diagram of a motor driving apparatus having only forward-to-reverse switching control, in which individual components are used. FIG. 2 is a concrete circuit diagram of FIG. 1.

A transmitter used in the remote control of model cars having a forward-to-reverse switching control has a non-modulated transmitting system having carrier frequency ranging from only 47 MHz to 49 MHz.

A super regenerative receiving circuit 1 in FIG. 1 or FIG. 2 generates a quenching frequency ranging from 100 KHz to 500 KHz. When there is not the transmitted signal from the said transmitter, said quenching signal is generated in the receiving circuit and a noise signal (20 Hz~10 KHz) is introduced to an antenna 11 and are mixed and fed to an amplifier 2 through a low pass filter composed of resistors $R_5$, $R_6$ and a capacitor $C_4$. However, when there is a transmitted signal from the transmitter, only the quenching signal is introduced to the amplifier 2. The amplifier amplifies only the noise frequency and the rotational direction of a motor M becomes forward or reverse through a detector 3 and a relay 4.

Therefore, said d.c. motor driving circuit for a remote controlled model car is manufactured at high cost and has a large size due to individual transistors, diodes, resistors and relay etc.

FIG. 3 is a linear integrated circuit for driving a d.c. motor disclosed in U.S. Pat. No. 4,488,094 by the present applicant.

This device of FIG. 3 includes an amplifier 6 for amplifying the audio frequency, a peak detector 7 for converting the said amplified signal into the d.c. signal, a comparator 8 having a hysteresis character, a motor driving circuit 9 and a voltage regulated circuit 10. This device has only the forward-to-reverse switching control.

This device suffers from the disadvantage of requiring two separate batteries and continuously pushing a transmitter switch on the transmitter to change the rotational direction of motor.

FIG. 4 is a block diagram of a d.c. motor driving circuit having three functions of forward rotation, stop and reverse rotation like the present invention. This device includes an amplifier 13, and pass filters 14 for obtaining three other frequencies in accordance with each operationg mode, peak detectors 15 for converting the signals drawn out of band pass filters into d.c. signal, comparators 16 and motor driving circuit 17.

This device of FIG. 4 has the disadvantages of complexity of a transmitting circuit and a receiving circuit and has low receiving sensitivity in comparison with the super regenerative receiving system generally used in a remote radio controlled model car.

SUMMARY OF INVENTION

Accordingly, it is a particular object of the present invention to provide an integrated circuit for driving a d.c. motor having a forward-to-reverse operational mode added to a latch mode by only one battery with low voltage.

Another object of the present invention is to provide an integrated circuit for driving a d.c. motor to be operated by a non-modulated transmitter signal.

Another object of the present invention is to provide an integrated circuit for driving a d.c. motor by a one touch transmitter.

DETAILED DESCRIPTION OF THE PREFERRED EMBODIMENTS

Figure 5:
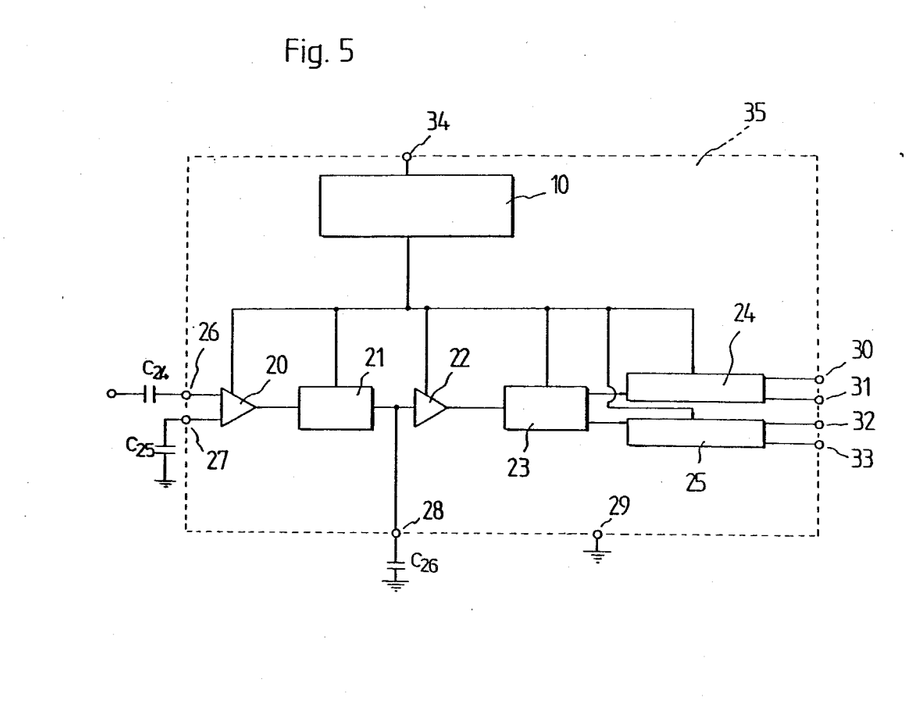
FIG. 5 is a block diagram of the integrated circuit for driving a d.c. motor according to the present invention.

Referring now to FIG. 5, it is a circuit block diagram illustrating the integrated circuit for driving a d.c. motor according to the present invention, which comprises an amplifier 20, a detector 21, a comparator 22, a direction control circuit 23, motor driving circuits 24, 25, a voltage regulating circuit 10, pins 26~34, and capacitors $C_{24} \sim C_{26}$. A battery is connected to the pin 34 and a stabilized voltage is fed into each block through the voltage regulating circuit 10. Pin 26 is an input pin terminal and input signal is fed into said pin 26 through capacitor $C_{24}$. The amplifier 20 is an a.c. amplifier and amplifies only the noise signal with an audio frequency.

The detector 21 together with the capacitor $C_{26}$ connected to the pin 28 is a peak detector and convertes the low frequency noise signal amplified by the amplifier 20 into a d.c. voltage.

The comparator 22 is a schmitt trigger circuit having a hysterisis characteristic and the direction control circuit 23 produces the signal to decide the operational modes of the d.c. motor by a switching control. The motor driving circuit 24, 25 functions to cause the rotational state of the d.c. motor of the motor circuit connected to the pins 30~33 to turn forward or in reverse or be stoped by the output signal of the direction control circuit 23.

Figure 6:
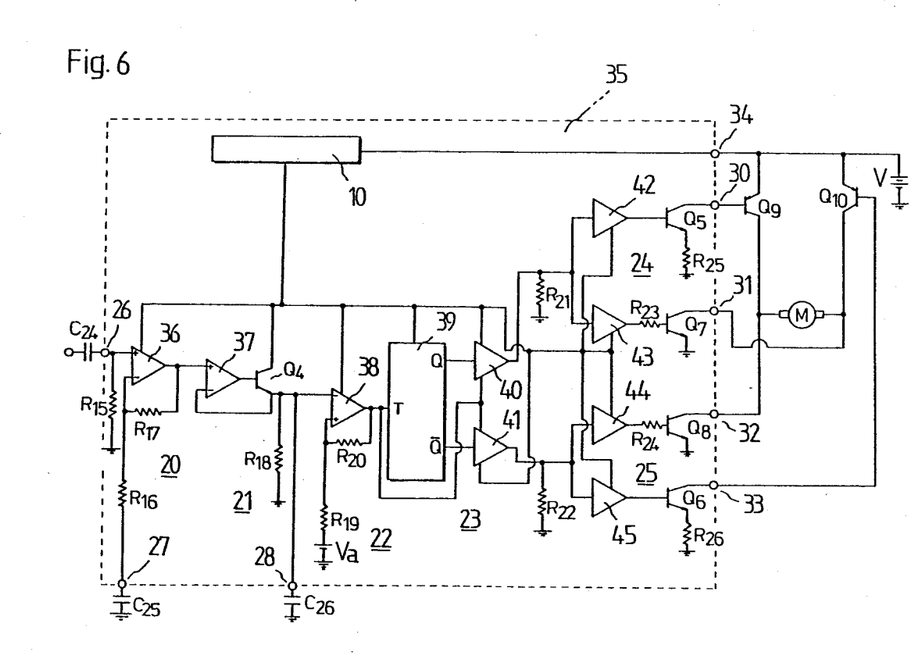
FIG. 6 is a concrete circuit diagram of FIG. 5 illustrating a preferred embodiment of a integrated circuit in accordance with the present invention.

FIG. 6 is a view illustrative of a concrete construction of FIG. 5. The voltage regulated circuit 10 is a known circuit and a constant voltage supplying circuit caused to protect and stabilize every circuits from the ripple and the noise generating at the motor starting time. The amplifier 20 includes an operational amplifier 36, resistors $R_{15} \sim R_{17}$ and capacitor $C_{25}$. The amplifier 20 is a positive amplifier feeding the input signal to the noninverting terminal of the operational amplifier 36. The d.c. output voltage of the amplifier 20 is a 0 volt regardless of the offset voltage of the operational amplifier 36 by the capacitor $C_{25}$ and the a.c. voltage amplification ratio of the amplifier 20 is (value of resistor 17/value of resistor 16)+1.

The detector 21 includes an operational amplifier 37, a transistor $Q_4$, a resistor $R_{18}$ and a capacitor $C_{26}$. The output voltage of the amplifier 20 is applied to a noninverting terminal of the operational amplifier 37 and the charging voltage of the capacitor $C_{26}$ is fed into the inverting terminal of the operational amplifier 37. Where the input voltage of the noninverting terminal of the operational amplifier 37 is greater than that of the inverting terminal of the operational amplifier 37, the transistor $Q_4$ is turned on and the output current of the operational amplifier 37 is applied to the capacitor $C_{26}$. However, where the input voltage of the said inverting terminal is greater than that of the said noninverting terminal, said transistor $Q_4$ is turned off and the said current applied to the capacitor $C_{26}$ is discharged through the resistor $R_{18}$. Therefore, the detector 21 is a peak voltage detector detecting the audio peak voltage fed into the noninverting terminal of the operational amplifier 37.

Figure 8:
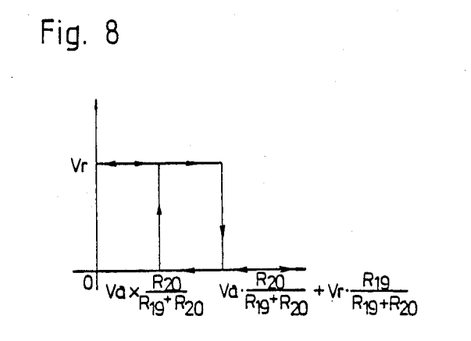
FIG. 8 is a hysteresis characteristic curve of a comparator.

The comparator 22 includes a operational amplifier 38, resistors $R_{19}$, $R_{20}$ and a reference voltage $V_a$. The input voltage which the output voltage of the comparator 22 is held on "1" state (high state : assuming as $V_r$) is $V_a \cdot R_{20}/(R_{19}+R_{20})$ and that which the output voltage of the comparator 22 is held on "0"state (low state: assuming as 0 volt) is $V_a \cdot R_{20}/(R_{19}+R_{20})+V_r \cdot R_{19}/(R_{19}+R_{20})$, as such is the comparator having a hysteresis characteristic as shown in FIG. 8. The misoperation of the d.c. motor due to the ripple voltage of the detector 21, the noise voltage of the d.c. motor M, or the intensity of the input signal is prevented by said hysteresis characteristic.

The direction control circuit 23 includes a T-flip-flop 39 and tristate buffers 40, 41. The T-flip-flop 39 operates on the up edge. The output voltage of the comparator 22 is fed into the T-flip-flop 39 and also used as the gate signal of tristate buffers 40, 41. Where the output voltage of the comparator 22 is "1", the input signal of tristate buffers 40, 41 transferred to the output of said tristate buffers 40, 41 and where it is "0", the output voltage of said tristate buffers 40, 41 is held on "0".

The motor driving circuit 24, 25 includes buffers 42~45, registers $R_{21} \sim R_{26}$ and transistors $Q_5 \sim Q_8$. Said buffers 42~45 are buffers for driving the transistors $Q_5 \sim Q_8$. Resistors $R_{23}$, $R_{24}$ are resistors to saturating the transistors $Q_7$, $Q_8$ when the input voltage of buffers 43, 44 are "1" and resistors $R_{25}$, $R_{26}$ are resistors for providing the current source of transistors $Q_5$, $Q_6$. Therefore, the output signals of both motor driving circuits 24 and 25 are always logical inverses. The motor circuit is composed of transistors $Q_9$, $Q_{10}$ and a motor M. Battery V is connected to the pin 30~34 of the integrated circuit for driving a d.c. motor 35. Where the input signal of the motor driving circuit 24 are "1" and that of the motor driving circuit 25 is "0", transistors $Q_5$, $Q_7$ are turned on and transistors $Q_8$, $Q_6$ are turned off and the motor driving current flows from transistor $Q_9$ to transistor $Q_7$ through motor M. However, where the input signals of the said motor driving circuits 24, 25 go reverse in comparison with the above states, transistors $Q_5$, $Q_7$ are turned off and transistors $Q_8$, $Q_6$ are turned on and the motor driving current flows from transistor $Q_{10}$ to transistor $Q_8$ through motor M. Therefore the rotational direction of the motor M reversed. However, where the input signal of the T-flip-flop 39 is "0", all of the transistors $Q_5 \sim Q_8$ are turned off and the motor M stops.

Figure 10:
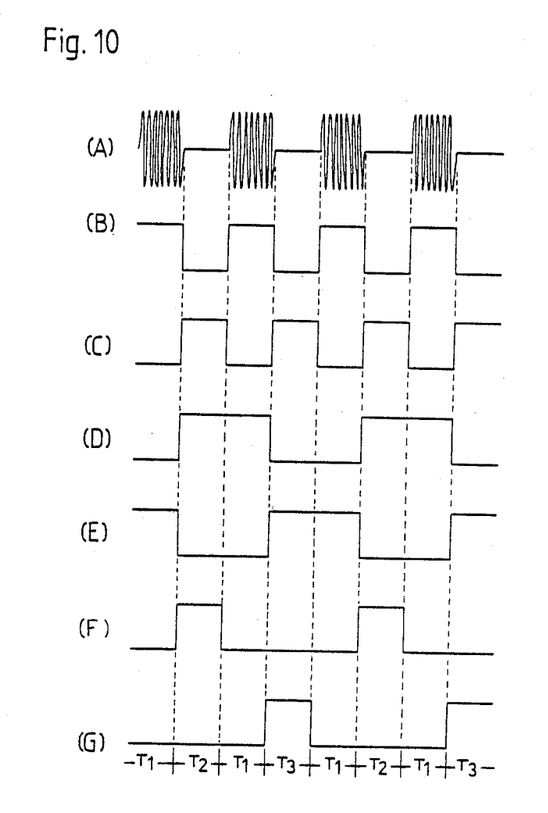
FIGS. 10(A) through (G) are timing diagrams of each point of FIG. 6 according to the present invention.

FIGS. 10 (A)~(G) are timing diagrams of each point of FIG. 6 according to the present invention. Now, we explain them omitting the quenching frequency signal.

FIG. 10 (A) is a timing diagram illustrating the audio noise frequency signal input to the pin 26 of the integrated circuit for driving a d.c. motor 35. The said input audio noise waveform shown in FIG. 10(A) is amplified by the audio amplifier 20 and the output signal of the said amplifier 20 is fed into the detector 21 and thereby detected absolutely by the capacitor $C_{26}$ as shown in FIG. 10 (B). The output waveform of the said detector 21 shown in FIG. 10 (B) is applied to the inverting terminal of a operational amplifier 38 comprising the comparator 22 and therefore the waveform shown in FIG. 10 (C) is drawn out. The said waveform in FIG. 10 (C) is fed into the T-flip-flop 39 comprising the direction control circuit 23 and thereby a waveform in FIG. 10 (D) is drawn out of the output terminal Q of the T-flip-flop 39 and a waveform in FIG. 10 (E) is an output signal from the terminal $\overline{Q}$. The waveform in FIG. 10 (C) is used as a gate signal of tristate buffers 40, 41. Therefore a waveform shown in FIG. 10 (F) is generated at the output terminal of the tristate buffer 40 and a waveform shown in FIG. 10 (E) at the output terminal of the tristate buffer 41.

During the time period $T_1$ of waveforms shown in FIGS. 10 (F) and 10 (G), since the input signals of motor driving circuits 24, 25 are all at the logical "0" state, transistors $Q_5 \sim Q_8$ are all turned off and thus, the rotation of motor stops.

However, during the time period $T_2$, since the input signal of the motor driving circuit 24 is at the logical "1" state and that of the motor driving circuit 25 is at the logical "0" state, transistors $Q_5$ and $Q_7$ are all turned on and transistors $Q_8$ and $Q_6$ are all turned off and thus, the rotation of motor M becomes forward. During the time $T_3$, since the input signal of the motor driving circuit 24 goes to a logical "0" state and that of the motor driving circuit 25 goes to a logical "1" state, transistors $Q_5$ and $Q_7$ are all "OFF" and transistors $Q_8$ and $Q_6$ are all "ON" and thus, the rotation of motor M becomes reverse.

Therefore the integrated circuit for driving a d.c. motor 35 functions as forward rotation, stop and reverse rotation of motor M.

Figure 7:
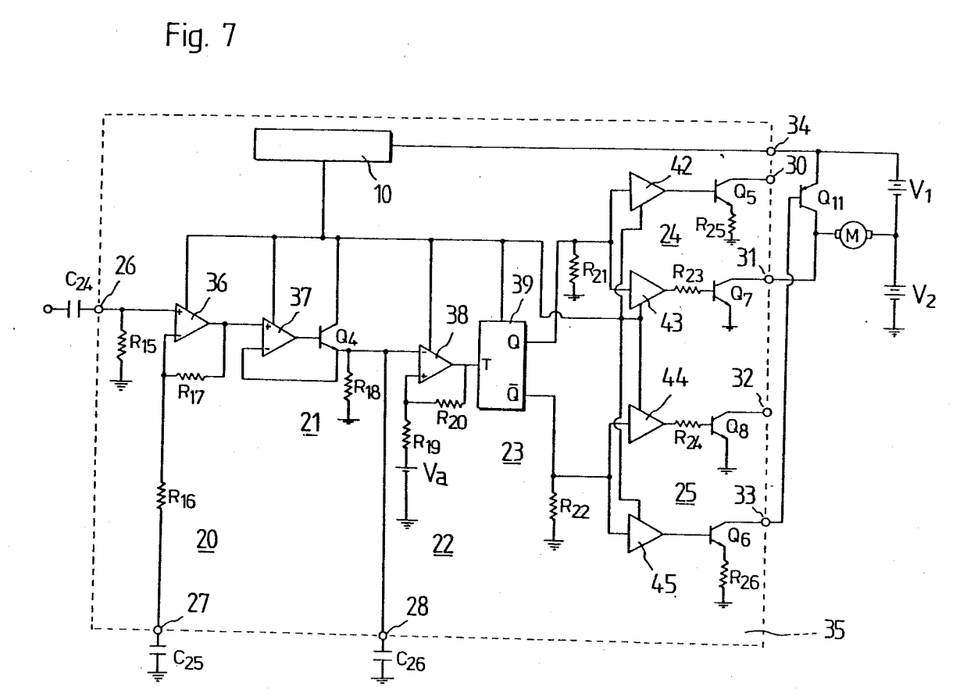
FIG. 7 is a concrete circuit diagram of an alternative embodiment of FIG. 5 in accordance with the present invention.

FIG. 7 is a concrete circuit taking functions of forward-reverse motor rotation.

FIG. 7 is an embodiment using only the T-flip-flop 39 comprising the direction control circuit 23.

As shown in FIG. 7, the motor circuit composed of a transistor $Q_{11}$, a motor M and batteries $V_1$, $V_2$ is connected to the output pins 31, 33 and the output terminals Q and $\overline{Q}$ of the T-flip-flop 39 directly connect to the input terminals of the motor driving circuits 24 and 25, respectively.

Operations of a voltage regulated circuit 10, an amplifier 20, a detector 21 and a comparator 22 as shown in FIG. 7 is same as those of FIG. 6.

Figure 11:
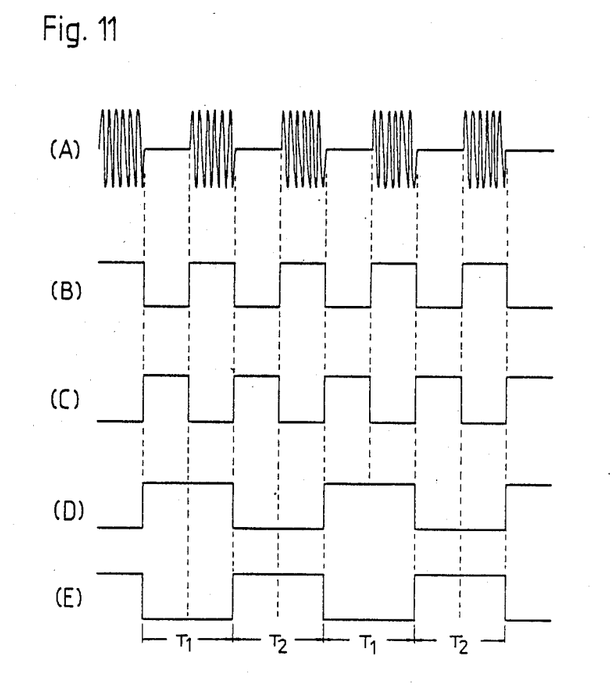
FIGS. 11(A) through (E) are waveforms of various points in FIG. 7.

FIGS. 11(A)~(E) are waveforms of various points in FIG. 7. FIG. 11(A) is a noise waveform introduced to a input pin 26 through a d.c. blocking capacitor $C_{24}$ omitting a quenching signal. The noise waveform shown in FIG. 11 (A) is amplified in the audio frequency range and detected by the peak detector 21 and subsequently a waveform shown in FIG. 11(B) produces from the output terminal of the said detector 21. The waveform shown in FIG. 11(B) is applied to a inverting terminal of the comparator 22. Thus a inverted waveform of FIG. 11(B) as shown in FIG. 11 (C) is drawn out thereof and fed to the direction control circuit 23 composed of a T-flip-flop 39. Therefore, waveforms shown in FIGS. 11 (D) and (E) are produced from output terminals Q and $\overline{Q}$ of the T-flip-flop 39, respectively.

During the time period $T_1$, since the input of the motor driving circuit 24 is at the "1" state and that of the motor driving circuit 25 is "0" state, the transistor $Q_7$ is turned off through buffer 43 and resistor $R_{23}$ and the transistor $Q_6$ is turned off through a buffer 45. Therefore a motor driving current flows from a battery $V_2$ to the transistor $Q_7$ through motor M.

However, during the time period $T_2$, since the input of the motor driving circuit 24 is at the "0" state and the input of the motor driving circuit 25 is at the "1" state, the transistor $Q_7$ is "OFF" and the transistor $Q_6$ is "ON" and thus a transistor $Q_{11}$ is also turned on. Therefore the motor driving current flows from a battery $V_1$ to motor M through the transistor $Q_{11}$ and the rotational direction of motor M becomes reverse in comparison with the above case.

The motor circuit composed of a transistor $Q_{11}$, motor M and batteries $V_1$ and $V_2$ as shown in FIG. 7 is provided to operate the motor M as two functions, i.e., forward rotation and reverse rotation.

But when the motor circuit composed of transistors $Q_9$, $Q_{10}$, motor M, and battery V using a low voltage as shown in FIG. 6 is connected correspondingly to the output pins 30~34 of FIG. 7 instead of the motor circuit composed of transistor $Q_{11}$, motor M and batteries $V_1$, $V_2$ as shown in FIG. 7, the motor M may have three functions such as forward rotation, stop and reverse rotation as mentioned above.

Alternately, when the motor circuit composed of the transistor $Q_{11}$, motor M and batteries $V_1$, $V_2$ as shown in FIG. 7 is connected correspondingly to the output pins 31, 33, 34 of FIG. 6 instead of the motor circuit composed of transistors $Q_9$ and $Q_{10}$, the motor M and the battery V as shown in FIG. 6, the motor M has two functions as a forward-reverse rotation as mentioned above.

Figure 9:
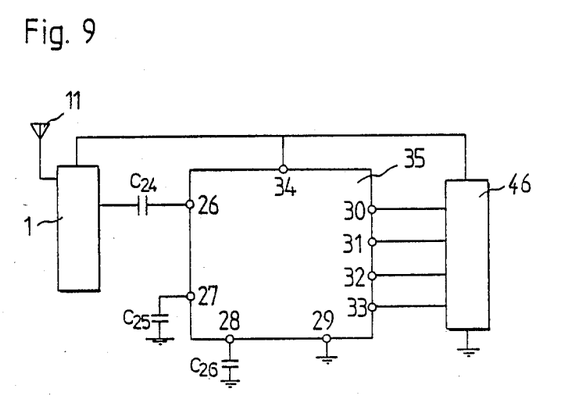
FIG. 9 is a block diagram illustrating the application of a integrated circuit in accordance with the present invention.

FIG. 9 is a preferred embodiment of a radio controlled device applied to the integrated circuit for driving a d.c. motor according to the present invention. FIG. 9 comprises an antenna 11, a super regenerative circuit 1, the integrated circuit for driving a d.c. motor 35, and a motor circuit 36.

The super regenerative circuit 1 is a known circuit as shown in FIG. 2. The motor circuit 36 is same as the motor circuit shown in FIG. 6 or FIG. 7.

A super regenerative receiving system is a high sensitive receiving system being able to transmit and receive between distant places with a low transmitting power. A transmitter not shown in the drawing generates only a non-modulated signal having a carrier frequency.

As mentioned above, when there is a transmitted signal from the transmitter, as shown in FIG. 2, a tank circuit composed of a coil $T_1$ and a capacitor $C_2$ becomes resonant with the carrier frequency of the transmitter and is mixed with the quenching frequency and thus only the quenching signal is drawn out of the super regenerative circuit 1 through a low pass filter composed of resistors $R_5$, $R_6$ and a capacitor $C_4$.

However, when there is no transmitted signal, the quenching signal generated by the transistor $Q_1$, the capacitor $C_1$ and the coil $L_1$ and the noise signal fed from the antenna 11 is introduced to the integrated circuit for driving a d.c. motor through the said low pass filter. In case the direction control circuit 23 of the integrated circuit 35 is constructed as shown in FIG. 6, when there is no transmitted signal from the transmitter as shown in FIG. 10, the rotation of motor M is stopped by the input of the noise signal and the quenching signal. When there is a transmitted signal, the input signal of the integrated circuit 35 is a quenching signal and said signal is cut off by the amplification band width of the audio amplifier 20. Therefore the rotation of the motor M becomes forward or reverse. In case the direction control circuit 23 of the integrated circuit 35 is constructed as shown in FIG. 7 and FIG. 11, the rotational direction of motor M is varied whenever there is a transmitted signal from the transmitter.

It will be understood that the integrated circuit according to the present invention takes advantage of reducing the power consumption of the transmitter, since the operation of the motor is variable by only one touch of transmitter button.

Another advantage according to the present invention is that the misoperation of the motor is prevented, since the rotation of the motor is stopped by very weak received signal generated from a long distance between a transmitter and a receiver.

While the invention has been described in detail and with reference to specific embodiments thereof, it will be apparent to one skilled in the art that various changes and modifications can be made therein without departing from the spirit and scope thereof.

What is claimed is:

1. An integrated circuit for driving a d.c. motor, comprising:
    radio signal receiving means for producing an output signal indicative of at least one radio signal, said receiving means connected to receive radio signals from a radio transmitter;
    an amplifier circuit for amplifying the output signal from the receiving means, said amplifier circuit having a frequency range including audio frequencies;
    peak detector means for converting the output signal of the amplifier circuit into a d.c. output voltage;
    a comparator circuit for filtering stray electrical pulses, said comparator circuit receiving the output voltage of the peak detector means and producing a filtered output voltage, and having a hysteresis characteristic that depends on the magnitude of said filtered output voltage;
    direction control means for generating first and second logic output signals from the filtered output voltage of the comparator circuit, said direction control means including first and second directional control circuits;

first and second motor driving means for producing an output including first and second motor driving signals in response to the logic output signals of the direction control means, said motor driving means connected in parallel with said directional control circuits;

a d.c. motor connected to receive the output of the direction control means and arranged to be driven in either direction or stopped in response thereto and a voltage regulating circuit for supplying a stabilized voltage to all circuit components.

2. The integrated circuit as recited in claim 1, wherein the direction control means further comprises a T-flip-flop set to operate on a leading edge or on a falling edge of the output voltage of the comparator circuit; and at least two tristate buffers connected to the T-flip-flop for using the output voltage of the comparator circuit as gate signals so that the rotation of the d.c. motor is stopped without a gate signal and the d.c. motor turns in a forward or reverse direction when there is a gate signal.

3. The integrated circuit as recited in claim 1, wherein the direction control means consists of a T-flip-flop connected so that the d.c. motor turns in a forward or reverse direction each time a signal is received from the comparator.

4. The integrated circuit as recited in claim 1, wherein the d.c. motor driving circuit further comprises:

first, second, third and fourth buffers for electrically isolating the motor driving circuit;

first and second transistors connected to the first and second buffers, said transistors having logic output responsive to the output signal from the direction control circuit; and third and fourth transistors connected to third and fourth buffers which function as constant current sources.

5. The integrated circuit as recited in claim 1, claim 2, or claim 3, further including a motor control circuit connected between the output of the motor driving means and the d.c. motor, said motor control circuit including two transistors and one battery forming an integrated circuit, said motor control circuit connected to the d.c. motor so that the motor may be operated forwards, in reverse or be stopped.

6. The integrated circuit as recited in claim 1, claim 2, or claim 3, having a motor control circuit connected between the output of the motor driving means and the d.c. motor, said motor control circuit including a transistor and two batteries and arranged to form an integrated circuit which is connected to the d.c. motor so that the d.c. motor may be operated in a forward direction, in a reverse direction or be stopped.

* * * * *